(12) United States Patent
Dewa (10) Patent No.: US 8,479,244 B2
(45) Date of Patent: Jul. 2, 2013

(54) RECEIVING APPARATUS, DISPLAY CONTROL METHOD, AND PROGRAM

(75) Inventor: Yoshiharu Dewa, Tokyo (JP)

(73) Assignee: Sony Corporation, Tokyo (JP)

( * ) Notice: Subject to any disclaimer, the term of this patent is extended or adjusted under 35 U.S.C. 154(b) by 273 days.

(21) Appl. No.: 12/473,395

(22) Filed: May 28, 2009

(65) Prior Publication Data

US 2009/0300696 A1  Dec. 3, 2009

(30) Foreign Application Priority Data

Jun. 3, 2008 (JP) ................................ P2008-145690

(51) Int. Cl.
*H04N 7/173* (2011.01)
(52) U.S. Cl.
USPC ........................................................ 725/110
(58) Field of Classification Search
USPC ........................................................ 725/110
See application file for complete search history.

(56) References Cited

U.S. PATENT DOCUMENTS

| 7,681,225 | B2 * | 3/2010 | Nishizawa et al. | 725/109 |
| 2005/0210531 | A1 * | 9/2005 | Bertin | 725/143 |
| 2007/0006272 | A1 * | 1/2007 | Kikkoji et al. | 725/100 |
| 2007/0083908 | A1 * | 4/2007 | McCarthy et al. | 725/112 |

FOREIGN PATENT DOCUMENTS

JP    2008-109606    5/2008

* cited by examiner

*Primary Examiner* — Pankaj Kumar
*Assistant Examiner* — Charles N Hicks
(74) *Attorney, Agent, or Firm* — Sherr & Jiang, PLLC

(57) ABSTRACT

A receiving apparatus includes: a receiving means for receiving broadcasted broadcast content and information relating thereto; an acquisition means for acquiring network content and information relating thereto from a predetermined server via a network; and a start-up controlling means for starting up, in a non-display state, a browser which provides a frame display of the broadcast content and the information relating to the broadcast content and also provides a frame display of the network content and the information relating to the network content, and maintaining the start-up condition of the browser, regardless of whether the receiving apparatus is in a broadcast content mode in which at least one of the broadcast content or the information relating to the broadcast content is displayed, or in a network content mode in which at least one of the network content or the information relating to the network content is displayed.

6 Claims, 11 Drawing Sheets

RECEIVING APPARATUS, DISPLAY CONTROL METHOD, AND PROGRAM

BACKGROUND OF THE INVENTION

1. Field of the Invention

The present invention relates to a receiving apparatus, a display control method, and a program, and in particular relates to a receiving apparatus, a display control method, and a program with which it is possible to shift seamlessly between a condition of displaying broadcast content, typified by a television program, and a condition of displaying network content acquired from a predetermined server via a communication network, typified by the internet.

2. Description of Related Art

At present, a digital television receiver (hereafter abbreviated simply to "TV") which can receive a terrestrial digital broadcast is becoming widespread. Also, a TV which can download and accumulate content (hereafter called "network content"), such as a movie, via the internet, and reproduce the accumulated network content at an optional timing, has appeared (for example, refer to JP-A-2008-109606).

In a terrestrial digital broadcast, a Broadband Satellite (BS) digital broadcast, or the like, a signal of a data broadcast (described using Broadcast Markup Language (BML) for providing a viewer with information relating to a television program, news, a weather forecast, traffic information, or the like, is broadcast multiplexed in a signal of a so-called television program configured of a so-called picture and sound.

The data broadcast in the TV is displayed in response to, for example, a user viewing a television program (hereafter also called broadcast content) operating a d (data-linked) button provided on a remote controller.

Figure 1A:
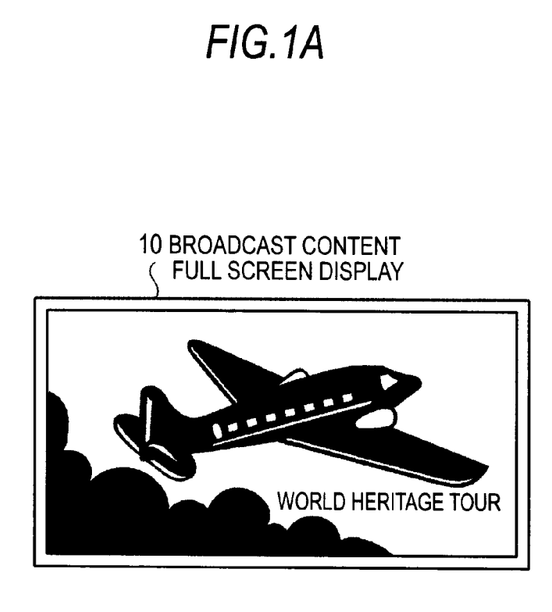
FIGS. 1A and 1B are examples of displays illustrating a shift to a data broadcast display.
Figure 1B:
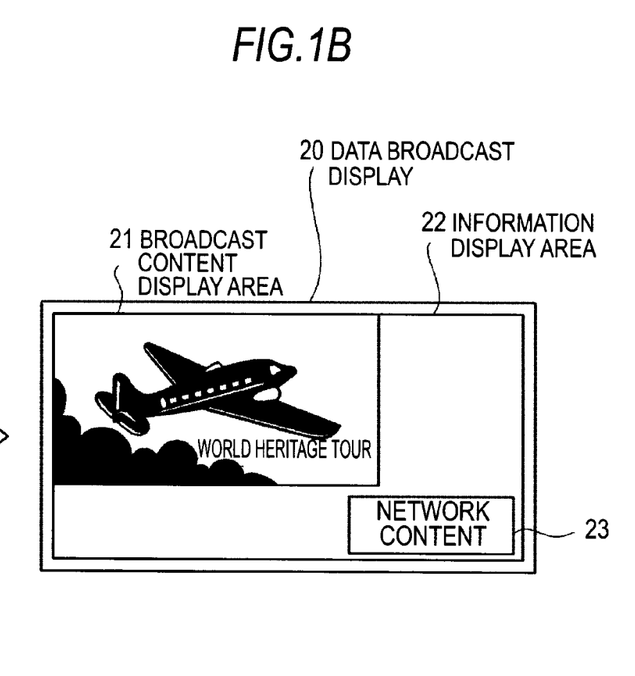

For example, in the event that the d button is operated when the condition of the TV screen is a broadcast content full screen display 10, as shown in FIG. 1A, a data broadcast browser which interprets BML for displaying a data broadcast screen is started up, and the condition of the screen changes to a data broadcast display 20, as shown in FIG. 1B.

A broadcast content display area 21, in which the program which was being viewed is displayed in a reduced size, and an information display area 22, in which information based on the data broadcast is displayed, are provided in the frame-displayed data broadcast display 20. Also, a network content button 23, which is operated when shifting to a network content portal screen display 30 (FIGS. 4A to 4C), is provided in the information display area 22 (details to be described hereafter).

In the event that the d button is operated again in the condition of the data broadcast display 20, the screen condition changes to the broadcast content full screen display 10. That is, an arrangement is such that every time the d button is operated, the screen condition is switched back and forth between the broadcast content full screen display 10 and the data broadcast display 20.

Figure 2:
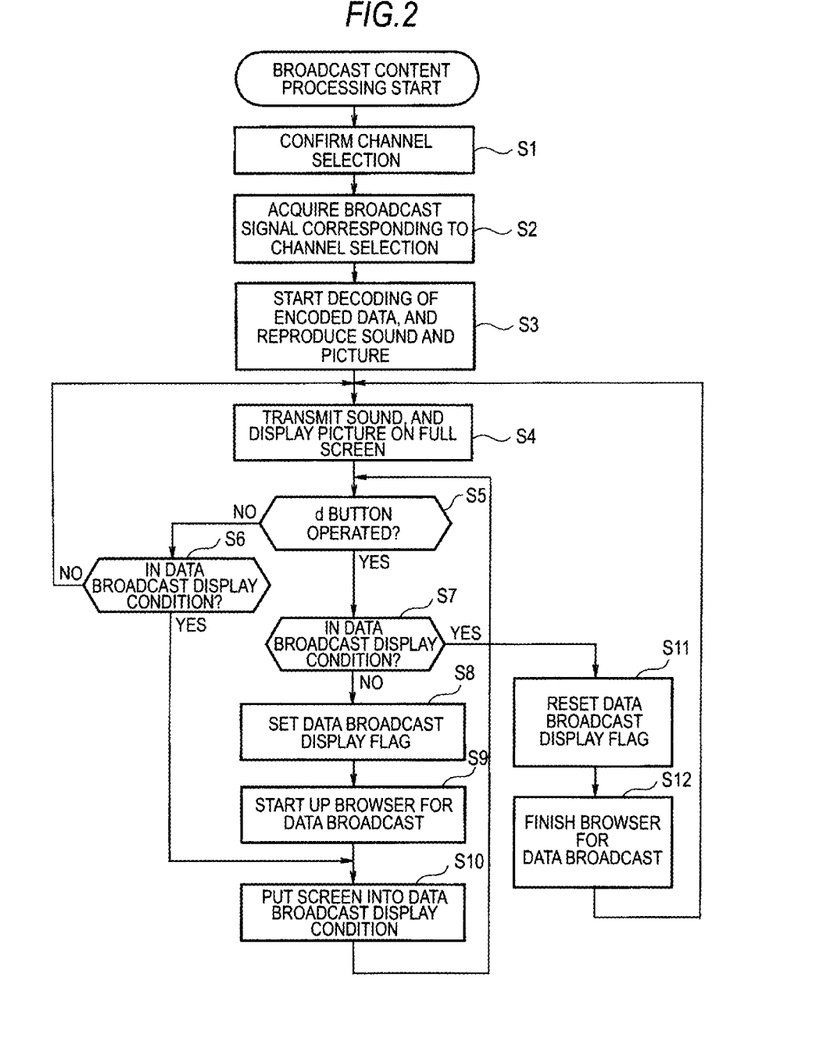
FIG. 2 is a flowchart illustrating a broadcast content process.

A description will be given, referring to the flowchart of FIG. 2, of an operation when switching between the broadcast content full screen display 10 and the data broadcast display 20 (hereafter called a "broadcast content process") using the heretofore known TV. The broadcast content process is started when the power source of the TV is activated, or when the channel selection has been changed (when the channel has been switched).

In step S1, the TV confirms a channel selection by the user. In step S2, the TV acquires the frequency component corresponding to the user's channel selection from a broadcast signal input via an antenna or the like. In step S3, the TV starts a decoding of encoded data (for example, MPEG2TS) included in the acquired frequency component, and reproduces a sound and picture. In step S4, the TV, as well as outputting the reproduced sound from a speaker, displays the reproduced picture on a full screen on a display (the condition of FIG. 1A).

In step S5, the TV determines whether or not the d button of the remote controller has been operated by the user. If it is determined that the d button has not been operated, the TV advances the process to step S6, and determines whether or not the screen is in the condition of the data broadcast display 20. This determination is carried out based on a data broadcast display flag, to be described hereafter. If it is determined, in step S6, that the screen is not in the condition of the data broadcast display 20, the process returns to step S4, and the condition of the broadcast content full screen display 10 is continued.

If it is determined, in step S5, that the d button has been operated, the TV advances the process to step S7, and determines whether or not the screen is in the condition of the data broadcast display 20. This determination too is carried out based on the data broadcast display flag to be described hereafter. If it is determined, in step S7, that the screen is not in the condition of the data broadcast display 20, the process is advanced to step S8. In step S8, the TV sets the data broadcast display flag in such a way as to indicate that the screen is in the condition of the data broadcast display 20.

In step S9, the TV starts up the data broadcast browser. In step S10, the TV, based on a data broadcast signal separated from the frequency component acquired in step S2, puts the display screen into the condition of the data broadcast display 20 (the condition of FIG. 1B), using the data broadcast browser. Subsequently, the process is returned to step S5, and the process from there on is repeated.

That is, when the data broadcast display 20 is displayed on the screen, as long as the d button is not operated again, the process is advanced to step S6, it is determined that the screen is in the condition of the data broadcast display 20, the process is advanced to step S10, and the condition of the data broadcast display 20 is continued.

Conversely, when the d button is operated again when the data broadcast display 20 is displayed on the screen, the process is advanced to step S7, it is determined that the screen is in the condition of the data broadcast display 20, and the process is advanced to step S11. In step S11, the TV resets the data broadcast display flag in such a way as to indicate that the screen is not in the condition of the data broadcast display 20. In step S12, the TV finishes the data broadcast browser which has been started up. Subsequently, the process returns to step S4, and the process from there on is repeated. Consequently, the screen changes to the condition of the broadcast content full screen display 10 shown in FIG. 1A.

Figure 3A:
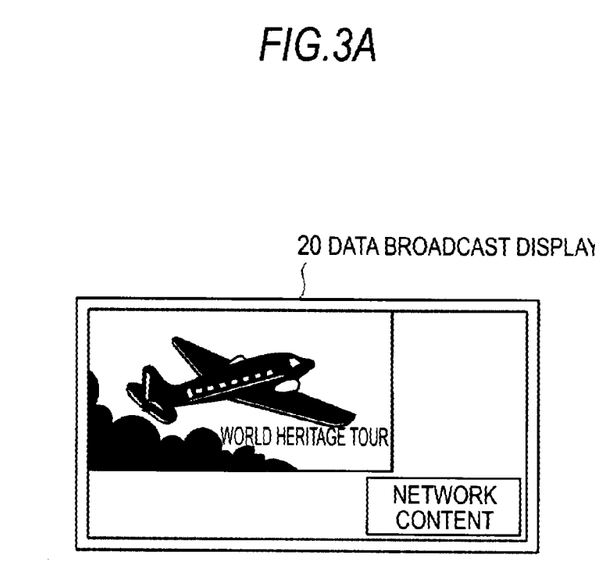
FIGS. 3A and 3B are examples of displays illustrating a problem in the condition of the data broadcast display.
Figure 3B:
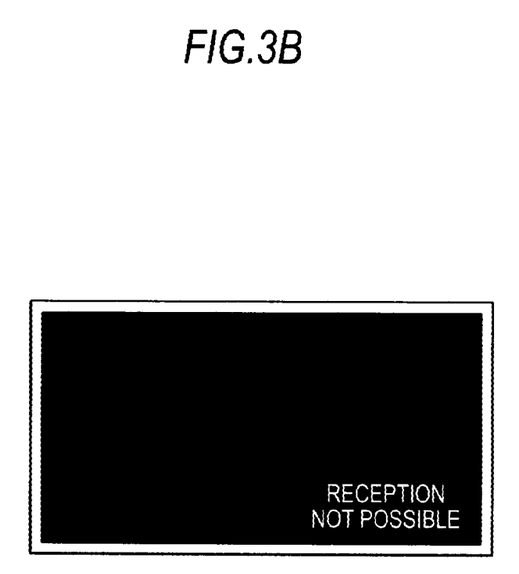

According to the heretofore described broadcast content process, it is possible to switch between the broadcast content full screen display 10 and the data broadcast display 20. However, as the data broadcast signal for displaying the data broadcast display 20 is broadcast multiplexed in encoded data of the broadcast content, as heretofore described, in the event that, in the condition of the data broadcast display 20 shown in FIG. 3A, it becomes difficult to receive the broadcast signal due to rain damage or the like, the data broadcast browser is compulsorily finished, and the whole of the display screen becomes blank (except for a warning display such as "Reception not possible"), as shown in FIG. 3B.

Next, a description will be given of a portal screen for inputting operations selecting network content to be downloaded, and instructing a reproduction thereof. The portal screen is displayed, for example, in response to a predetermined first button (for example, an acTVila (trademark) button) provided on the TV remote controller being operated by the user. Alternatively, the portal screen is displayed in response to the network content button 23 provided in the information display area 22 of the data broadcast display 20 being operated.

Figure 4A:
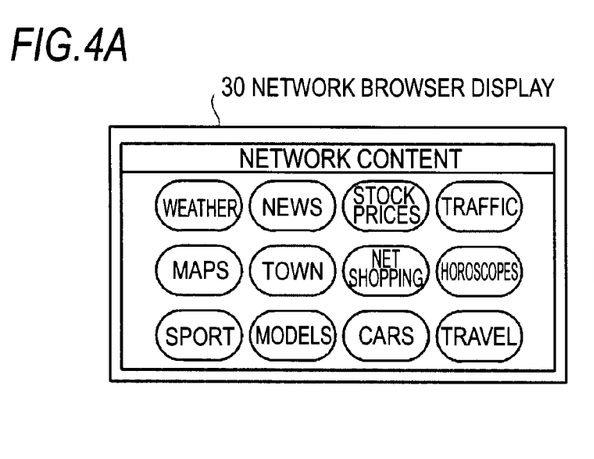
FIGS. 4A to 4C are examples of displays illustrating a shift to a simulated data broadcast display.
Figure 4B:
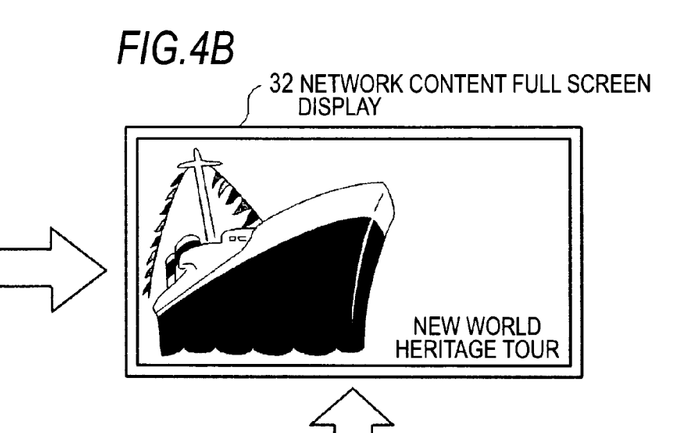
Figure 4C:
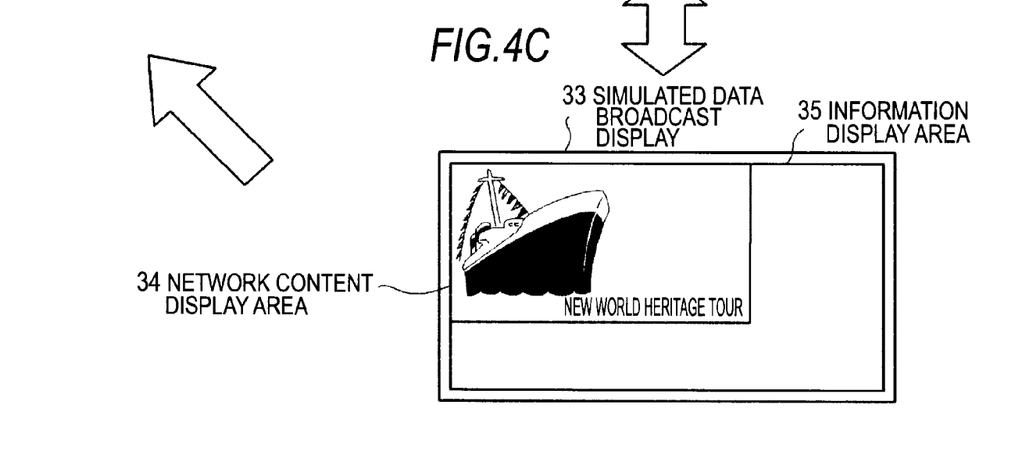

That is, when the predetermined first button of the remote controller, or the network content button 23 in the data broadcast display 20, is operated, a network browser, which interprets Hyper Text Markup Language (HTML) for displaying the network content portal screen, is started up. Then, the kind of portal screen display 30 shown in FIG. 4A is displayed by the network browser. Also, when a network content reproduction instruction is input on the portal screen display 30, the screen condition changes to a network content full screen display 32, as shown in FIG. 4B. When a predetermined second button (hereafter called a "simulated data broadcast display button") is operated in this condition, the screen condition changes, using the network browser, to a simulated data broadcast display 33, frame-displayed in the same way as the heretofore described data broadcast display 20, as shown in FIG. 4C.

A network content display area 34, in which the network content which was being displayed on the full screen is displayed reduced in size, and an information display area 35, in which information relating to the network content data being reproduced is displayed, are provided in the simulated data broadcast display 33.

In the event that the simulated data broadcast display button is operated again with the screen in the condition of the simulated data broadcast display 33, the screen changes to the condition of the network content full screen display 32. That is, every time the simulated data broadcast display button is operated, the screen condition is switched back and forth between the network content full screen display 32 and the simulated data broadcast display 33. Then, an arrangement is such that, in the event that the reproduction of the network content finishes in the condition of the network content full screen display 32, or of the simulated data broadcast display 33, the screen shifts to the condition of the portal screen display 30.

Figure 5:
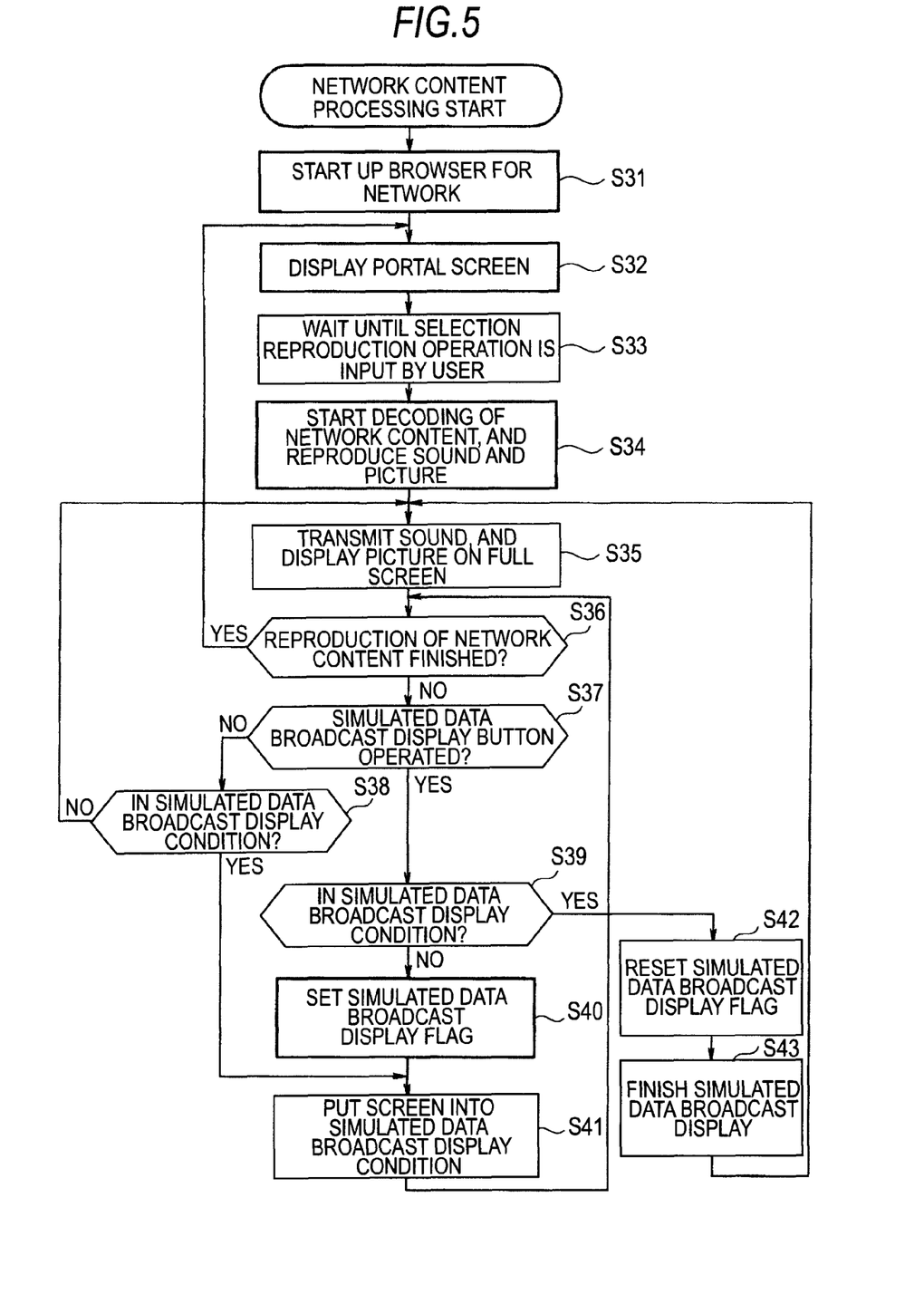
FIG. 5 is a flowchart illustrating a network content process.

A description will be given, referring to the flowchart of FIG. 5, of an operation when switching between the network content full screen display 32 and the simulated data broadcast display 33 (hereafter called a "network content process") using the heretofore known TV.

The network content process is started in response to the predetermined first button of the remote controller, or the network content button 23 in the data broadcast display 20, being operated by the user.

In step S31, the TV starts up a network browser which interprets HTML, and connects to a predetermined server on the internet using the started up network browser. In step S32, the network browser acquires HTML data, or the like, for displaying the portal screen from the connected server, and puts the screen into the condition of the portal screen display 30 (the condition of FIG. 4A).

In step S33, the network browser waits until an operation (a selection and reproduction operation) specifying network content to be reproduced is input by the user. Then, when a selection and reproduction operation is input, the network browser, in step S34, starts a decoding of the specified network content, and reproduces a sound and picture. It is acceptable that the network content decoded here is content of which a download is already complete, and it is also acceptable that it is content which is being downloaded (content of a so-called progressive download).

In step S35, the network browser, as well as outputting the reproduced sound from the speaker, displays the reproduced picture on a full screen on the display (the condition of FIG. 4B).

In step S36, the network browser determines whether or not the reproduction of the network content is finished. If the reproduction of the network content is not finished, the process is advanced to step S37.

In step S37, the network browser determines whether or not the simulated data broadcast display button has been operated by the user. If it is determined that the simulated data broadcast display button has not been operated, the process is advanced to step S38. In step S38, the network browser determines whether or not the screen is in the condition of the simulated data broadcast display 33. This determination is carried out based on a simulated data broadcast display flag, to be described hereafter. If it is determined, in step S38, that the screen is not in the condition of the simulated data broadcast display 33, the process returns to step S35. Consequently, the screen continues to be in the condition of the network content full screen display 32.

If it is determined, in step S37, that the simulated data broadcast display button has been operated, the network browser advances the process to step S39, and determines whether or not the screen is in the condition of the simulated data broadcast display 33. This determination too is carried out based on the simulated data broadcast display flag to be described hereafter. If it is determined, in step S39, that the screen is not in the condition of the simulated data broadcast display 33, the process is advanced to step S40. In step S40, the network browser sets the simulated data broadcast display flag in such a way as to indicate that the screen is in the condition of the simulated data broadcast display 33. In step S41, the network browser puts the screen into the condition of the simulated data broadcast display 33 (the condition of FIG. 4C). Subsequently, the process is returned to step S36, and the process from there on is repeated.

That is, when the simulated data broadcast display 33 is being displayed without the reproduction of the network content finishing, as long as the predetermined second button is not operated again, the process is advanced to step S38, it is determined that the screen is in the condition of the simulated data broadcast display 33, the process is advanced to step S41, and the condition of the simulated data broadcast display 33 is continued.

Conversely, when the simulated data broadcast display button is operated again when the screen is in the condition of the simulated data broadcast display 33 without the reproduction of the network content finishing, the process is advanced to step S39, it is determined that the screen is in the condition of the simulated data broadcast display 33, and the process is advanced to step S42. In step S42, the network browser resets the simulated data broadcast display flag in such a way as to indicate that the screen is not in the condition of the simulated data broadcast display 33. In step S43, the network browser finishes the condition of the simulated data broadcast display 33. Subsequently, the process returns to step S35, and the process from there on is repeated. Consequently, the screen changes to the condition of the network content full screen display 32 shown in FIG. 4B.

Figure 6A:
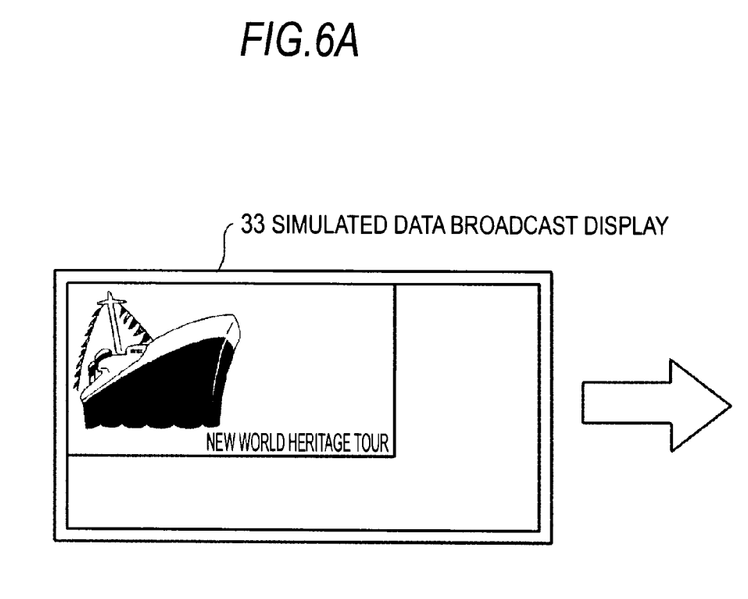
FIGS. 6A and 6B are examples of displays illustrating a problem in the condition of the data broadcast display.
Figure 6B:
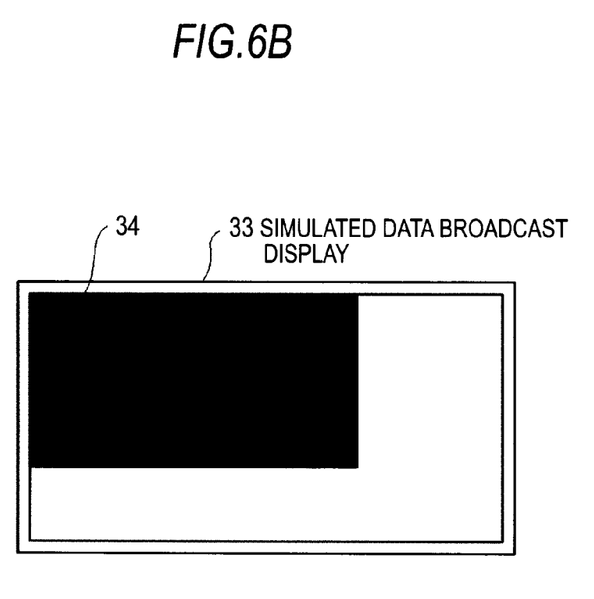

According to the heretofore described network content process, it is possible to switch between the network content full screen display 32 and the simulated data broadcast display 33. Also, even in the event that the connection between the network browser and the server is cut with the screen in the condition of the simulated data broadcast display 33, the condition of the simulated data broadcast display 33 is maintained, as shown in FIG. 6A. At this time, in the event that the network content is being progressively downloaded, only the network content display area 34 of the simulated data broadcast display 33 becomes blank, while the simulated data broadcast display 33 is maintained, as shown in FIG. 6B.

As heretofore described, according to the heretofore known TV, it is possible to execute the broadcast content process and the network content process. Consequently, with the heretofore known TV too, for example, the kinds of screen shift shown in FIGS. 7A to 7D are possible.

Figure 7A:
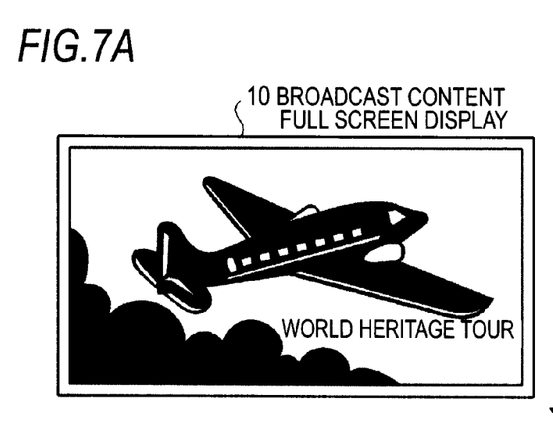
FIGS. 7A to 7D are examples of displays illustrating a shift from the data broadcast display to the simulated data broadcast display.
Figure 7B:
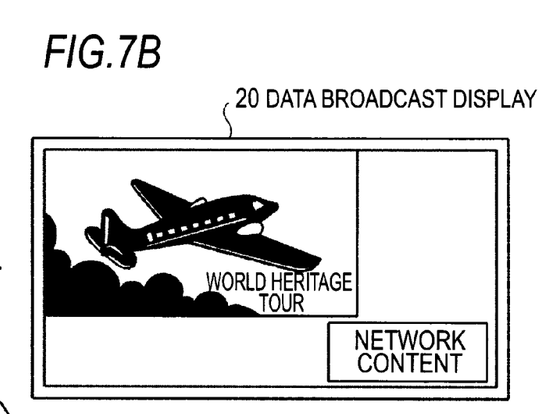
Figure 7C:
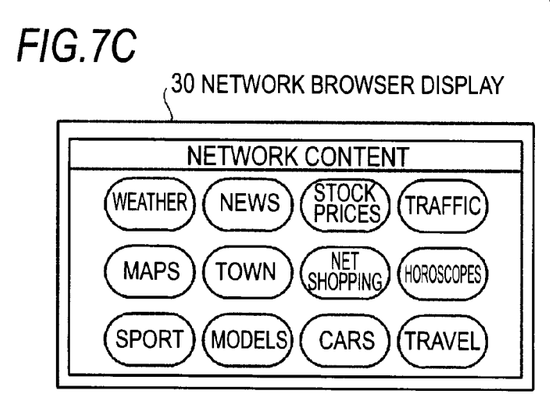
Figure 7D:
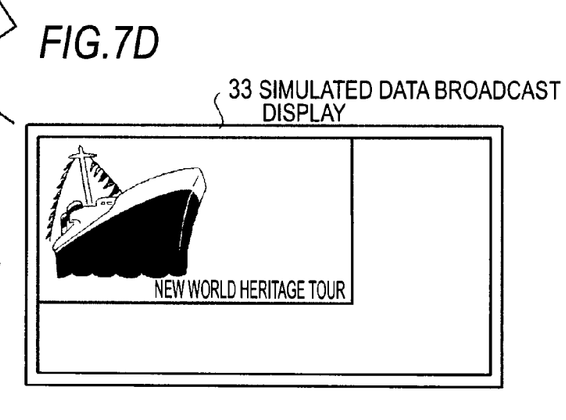

That is, it is possible to shift from the broadcast content full screen display 10 shown in FIG. 7A to the data broadcast display 20 shown in FIG. 7B, and from the data broadcast display 20 to the portal screen display 30 shown in FIG. 7C. Also, from the portal screen display 30, it is possible to shift, via the network content full screen display 32, to the simulated data broadcast display 33 shown in FIG. 7D. Furthermore, from the simulated data broadcast display 33, it is possible to shift to the broadcast content full screen display 10 in response to a channel selection operation (a depression or the like of a number button of the remote controller).

SUMMARY OF THE INVENTION

As heretofore described, with the heretofore known TV too, it is possible to shift from a condition of displaying broadcast content to a condition of displaying network content, as shown in FIGS. 7A to 7D.

However, it is not possible to shift directly between the data broadcast display 20 and the simulated data broadcast display 33, despite their display layouts being similar.

For example, it being necessary to finish the data broadcast browser and start up the network browser in order to shift from the data broadcast display 20 to the simulated data broadcast display 33, as far as the screen is concerned, it is necessary to go through at least the portal screen display 30 and the network content full screen display 32. Conversely, it being necessary to finish the network browser and start up the data broadcast browser in order to shift from the simulated data broadcast display 33 to the data broadcast display 20, as far as the screen is concerned, it is necessary to go through at least the broadcast content full screen display 10.

Thus, it is desirable to shift seamlessly between a condition of displaying broadcast content and a condition of displaying network content.

A receiving apparatus according to an embodiment of the invention includes a receiving means for receiving broadcasted broadcast content and information relating to the broadcast content, an acquisition means for acquiring network content and information relating to the network content from a predetermined server via a network, and a start-up controlling means for starting up, in a non-display state, a browser which provides a frame display of the broadcast content and the information relating to the broadcast content and also provides a frame display of the network content and the information relating to the network content, and maintaining the start-up condition of the browser regardless of whether the receiving apparatus is in a broadcast content mode in which at least one of the broadcast content or the information relating to the broadcast content is displayed, or in a network content mode in which at least one of the network content or the information relating to the network content is displayed.

The browser can switch between a display and non-display of the frame display in response to a predetermined operation by a user.

The receiving apparatus according to one embodiment of the invention may further include a maintaining means for maintaining a state of the frame display implemented in the browser.

A display control method of a receiving apparatus according to another embodiment of the invention includes the steps of receiving broadcasted broadcast content and information relating to the broadcast content, acquiring network content and information relating to the network content from a predetermined server via a network, starting up, in a non-display state, a browser which provides a frame display of the broadcast content and the information relating to the broadcast content and also provides a frame display of the network content and the information relating to the network content, and maintaining the start-up condition of the browser regardless of whether the receiving apparatus is in a broadcast content mode in which at least one of the broadcast content or the information relating to the broadcast content is displayed, or in a network content mode in which at least one of the network content or the information relating to the network content is displayed.

A program according to still another embodiment of the invention causes a computer to function as a receiving means for receiving broadcasted broadcast content and information relating to the broadcast content, an acquisition means for acquiring network content and information relating to the network content from a predetermined server via a network, and a start-up controlling means for starting up, in a non-display state, a browser which provides a frame display of the broadcast content and the information relating to the broadcast content and also provides a frame display of the network content and the information relating to the network content, and maintaining the start-up condition of the browser regardless of whether a broadcast content mode in which at least one of the broadcast content or the information relating to the broadcast content is displayed, or in a network content mode in which at least one of the network content or the information relating to the network content is displayed is selected.

In the embodiment of the invention, a browser which provides the frame display of the broadcast content and the information relating to the broadcast content and also provides the frame display of the network content and the information relating to the network content is started up in a non-display state, and the start-up condition of the browser is maintained regardless of whether a broadcast content mode in which at least one of the broadcast content or the information relating to the broadcast content is displayed, or in a network content mode in which at least one of the network content or the information relating to the network content is displayed is selected.

According to the embodiments of the invention, it is possible to shift seamlessly between a condition of displaying broadcast content and a condition of displaying network content.

DESCRIPTION OF THE PREFERRED EMBODIMENTS

Figure 8:
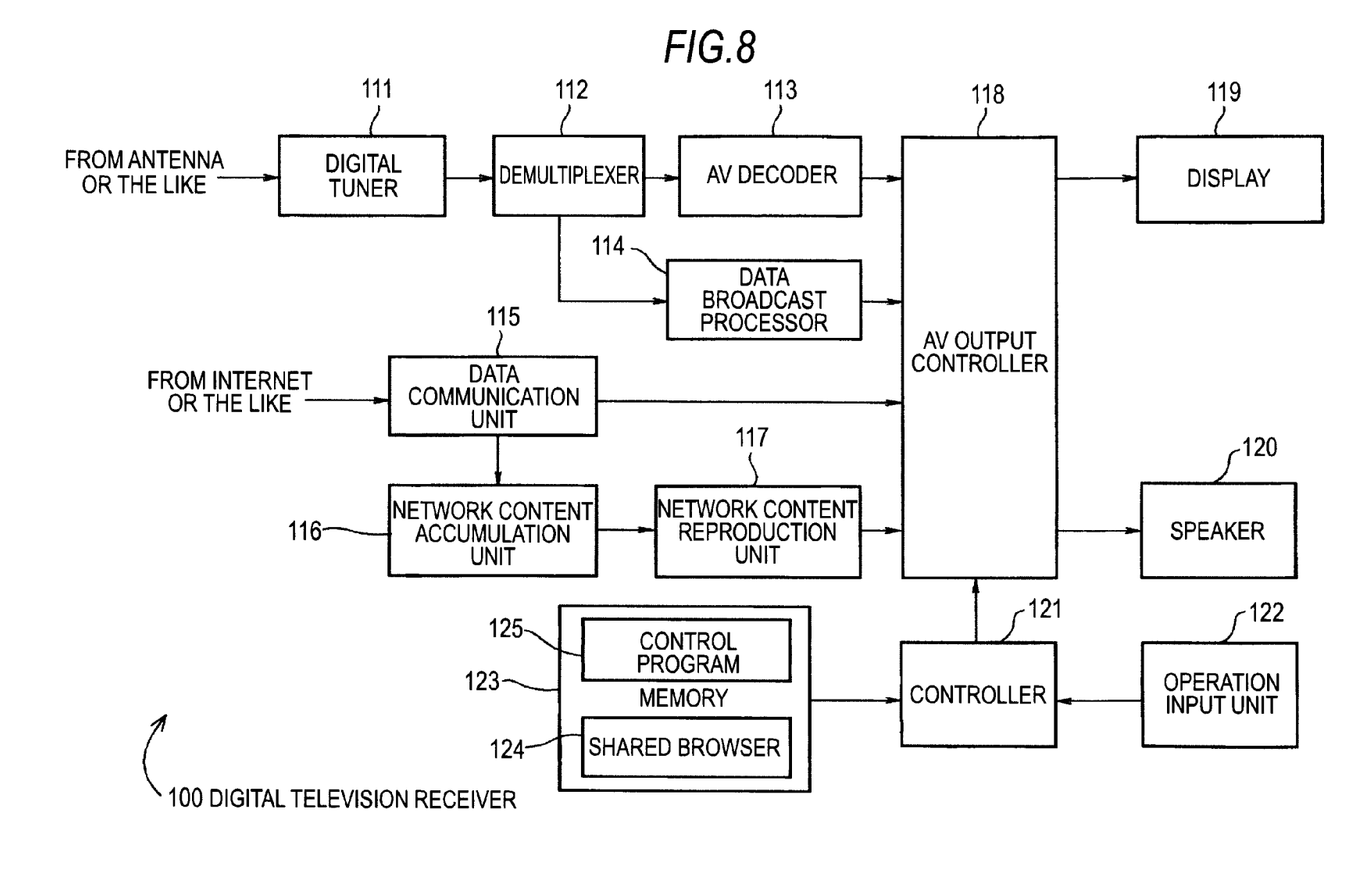
FIG. 8 is a block diagram showing a configuration example of a digital television receiver to which the invention is applied.

Hereafter, a description will be given, referring to FIG. 8, of a digital television receiver, which is one embodiment of the invention. FIG. 8 shows a configuration example of a digital television receiver 100, which is one embodiment of the invention.

The digital television receiver (hereafter abbreviated to "the digital TV") 100, in the same way as the heretofore described hitherto known TV, can receive a terrestrial digital broadcast, a BS digital broadcast, and the like, and put the screen into the condition of a broadcast content full screen display 10 shown in FIG. 1A, or the condition of a data broadcast display 20 shown in FIG. 1B.

Also, the digital TV 100, in the same way as the heretofore described hitherto known TV, can download and accumulate network content from a predetermined server via the internet, and reproduce the accumulated network content at an optional timing. Then, the digital TV 100 can put the screen into the condition of a portal screen display 30 shown in FIG. 4A, the condition of a network content full screen display 32 shown in FIG. 4B, or the condition of a simulated data broadcast display 33 shown in FIG. 4C.

Furthermore, the digital TV 100 can cause the screen to shift reciprocally and directly between the data broadcast display 20 shown in FIG. 1B and the simulated data broadcast display 33 shown in FIG. 4C.

The digital TV 100 includes, as a system for processing broadcast content, a digital tuner 111, which extracts a frequency component corresponding to a channel selection from a broadcast signal input via an antenna, a CATV cable, or the like, a demultiplexer 112, which separates encoded data such as MPEG2TS, and a data broadcast signal, from the frequency component of the broadcast signal corresponding to the channel selection, an AV decoder 113, which decodes the encoded data, and reproduces a sound signal and a picture signal, and a data broadcast processor 114, which processes the data broadcast signal.

Also, the digital TV 100 includes, as a system for processing network content, a data communication unit 115 connected to a predetermined server via the internet, or the like, a network content accumulation unit 116, which holds downloaded network content, and a network content reproduction unit 117, which reproduces a sound and a picture of the downloaded network content.

Furthermore, the digital TV 100 includes, as a picture and sound output system, an AV output controller 118, which controls an output of a sound and picture, a display 119, which displays a picture, and a speaker 120, which outputs a sound, and the digital TV 100 includes, as a control system, a controller 121, which controls the whole of the digital TV 100, an operation input unit 122, which inputs an operation by a user, and a memory 123, which holds a shared browser 124, a control program 125, and the like.

The shared browser 124 and control program 125 held in the memory 123 are retrieved and executed by the controller 121. The controller 121, by executing the shared browser 124, can interpret a BML and HTML. Consequently, the controller 121, by using the shared browser 124, can cause both the data broadcast display 20 shown in FIG. 1B and the simulated data broadcast display 33 shown in FIG. 4C to be displayed.

Figure 9:
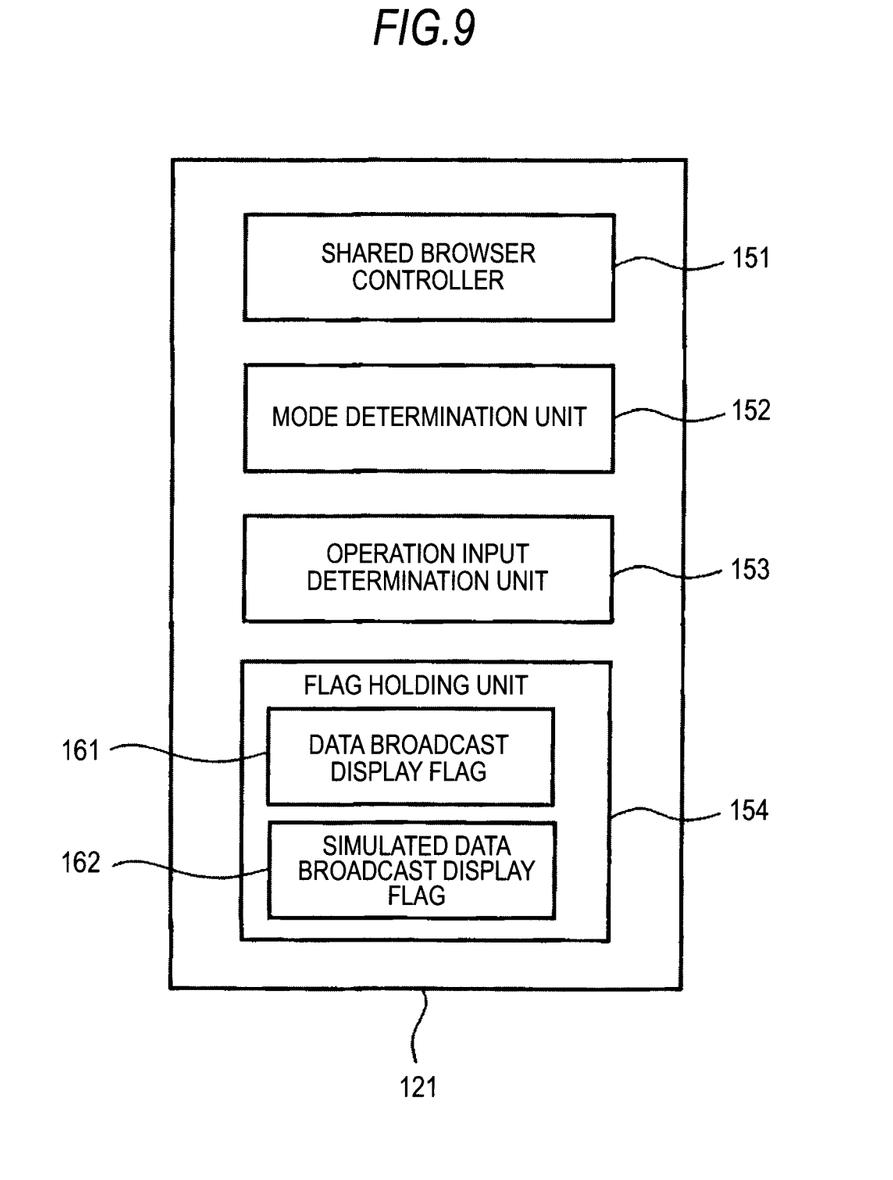
FIG. 9 is a diagram showing a configuration example of a function block realized by a controller of FIG. 8.

Also, the controller 121, by executing the control program 125, can realize each function block shown in FIG. 9. That is, the controller 121 which executes the control program 125 is configured of a shared browser controller 151, a mode determination unit 152, an operation input determination unit 153, and a flag holding unit 154 as shown in FIG. 9.

The shared browser controller 151 controls a start-up of the shared browser 124, and a display and non-display thereof. The mode determination unit 152 determines whether the current condition of the digital TV 100 is a broadcast content mode, in which broadcast content (including a data broadcast display) is displayed, or a network content mode, in which network content (including a portal screen, and a simulated data broadcast display) is displayed. Also, the mode determination unit 152, based on a data broadcast display flag 161 of the flag holding unit 154, determines whether or not the screen is in the condition of the data broadcast display 20. Furthermore, the mode determination unit 152, based on a simulated data broadcast display flag 162 of the flag holding unit 154, determines whether or not the screen is in the condition of the simulated data broadcast display 33.

The operation input determination unit 153 determines an existence or non-existence of each kind of operation input by the user, and the details thereof. The flag holding unit 154 holds the data broadcast display flag 161, which indicates whether or not the screen is in the condition of the data broadcast display 20, and the simulated data broadcast display flag 162, which indicates whether or not the screen is in the condition of the simulated data broadcast display 33, and sets and resets them.

Next, a description will be given, referring to the flowcharts of FIGS. 10 and 11, of a process for shifting seamlessly between a broadcast content display condition and a network content display condition, in particular, of a process for shifting reciprocally and directly between the data broadcast display 20 shown in FIG. 1B and the simulated data broadcast display 33 shown in FIG. 4C (hereafter called a "broadcast content and network content integration process"), using the digital TV 100.

The broadcast content and network content integration process starts when the power source of the digital TV 100 is activated.

In step S100, the shared browser controller 151 starts up the shared browser 124 held in the memory 123 in the non-display condition. In step S101, the mode determination unit 152 determines whether or not the current condition is the broadcast content mode. If it is determined that the current condition is the broadcast content mode, the process is advanced to step S102.

In step S102, the operation input determination unit 153 determines whether or not an operation instructing a shift to the network content mode (for example, an operation of a network content button 23 in the data broadcast display 20) has been carried out by the user. If it is determined that no operation instructing a shift to the network content mode has been carried out by the user, the process is advanced to step S103.

Figure 10:
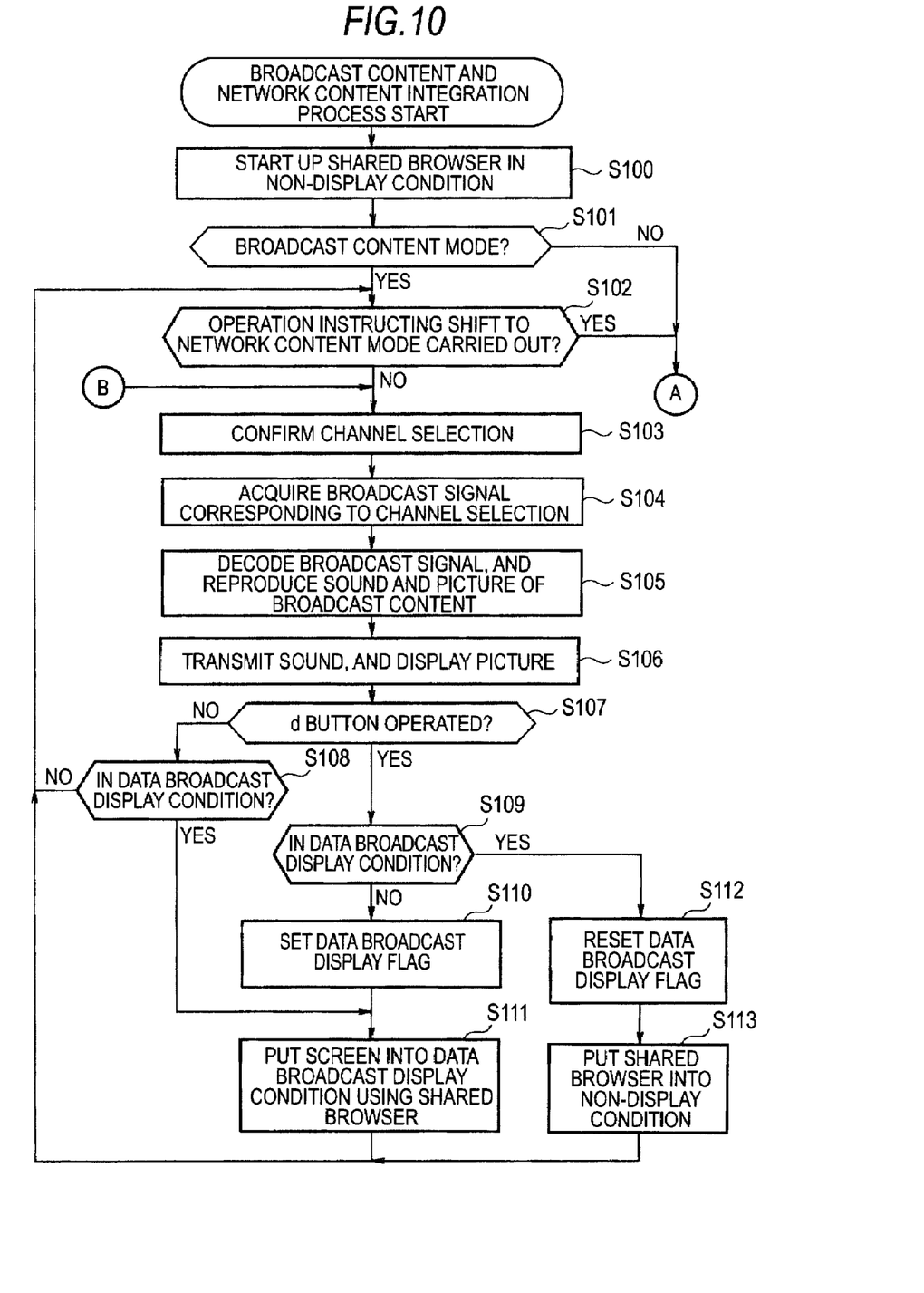
FIG. 10 is a flowchart illustrating a broadcast content and network content integration process.
Figure 11:
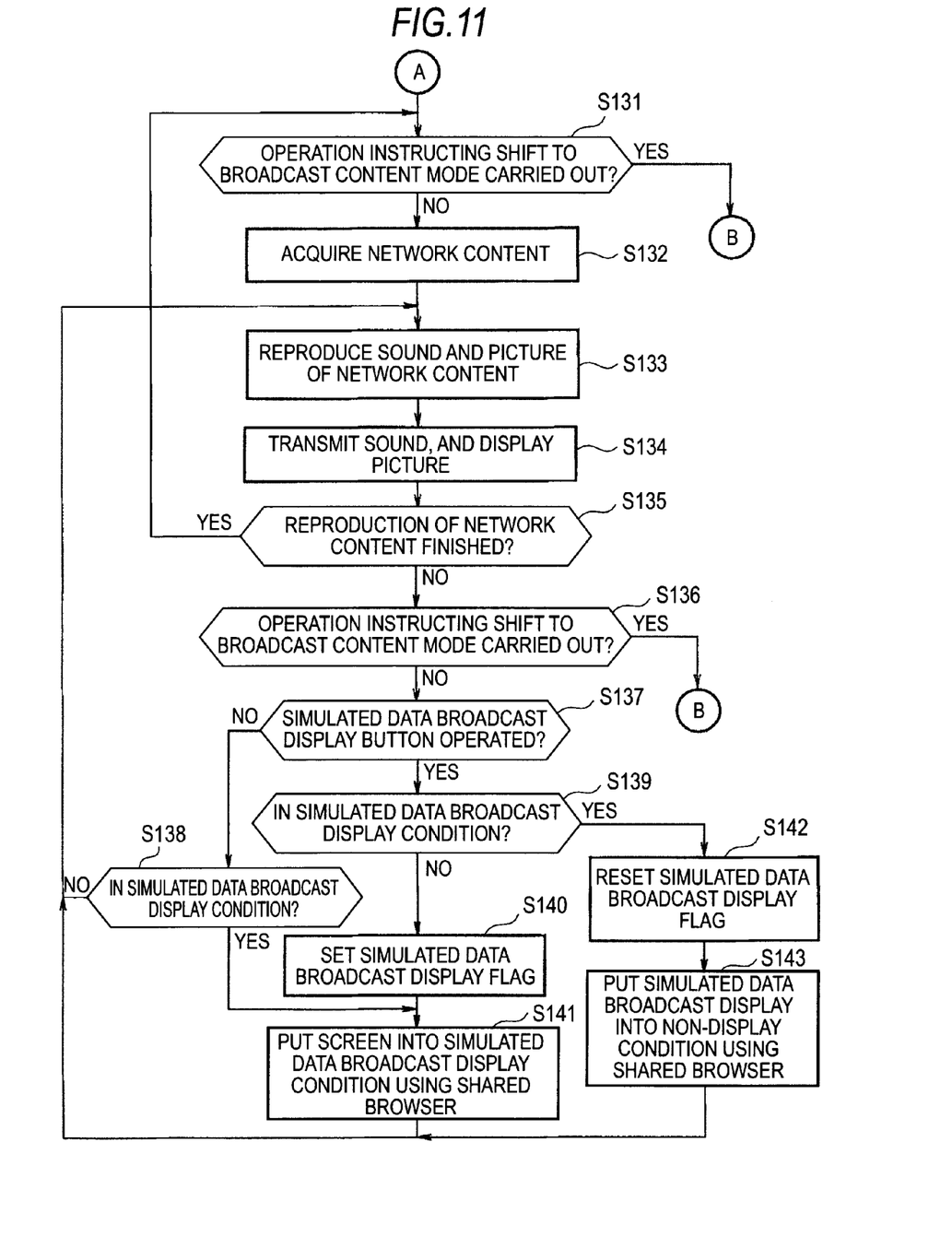
FIG. 11 is a flowchart illustrating the broadcast content and network content integration process.

If it is determined, in step S101, that the current condition is not the broadcast content mode, or if it is determined, in step S102, that an operation instructing a shift to the network content mode has been carried out by the user, the process shifts to step S131 of FIG. 11 (details to be described hereafter). It is taken that information on network content to be reproduced in the network content mode (an ID, a URL of a server from which the content can be acquired, and the like) is written in the network content button 23, in the data broadcast display 20, which is for inputting an operation instructing a shift.

In step S103, the operation input determination unit 153 confirms a channel selection by the user. In step S104, the digital tuner 111 extracts the frequency component corresponding to the user's channel selection from the broadcast signal input via the antenna or the like, and transmits it to the demultiplexer 112. The demultiplexer 112 separates the encoded data, and the data broadcast signal, from the transmitted frequency component, supplies the encoded data to the AV decoder 113, and supplies the data broadcast signal to the data broadcast processor 114.

In step S105, the AV decoder 113 decodes the encoded data (for example, MPEG2TS), reproduces the sound and the picture, and supplies them to the AV output controller 118. In step S106, the AV output controller 118, as well as outputting the reproduced sound from the speaker 120, causes the reproduced picture to be displayed on the display 119 in keeping with the display or non-display condition of the data broadcast display 20, or simulated data broadcast display 33, using the shared browser 124. That is, if, using the shared browser 124, the data broadcast display 20 and simulated data broadcast display 33 are in the non-display condition, the reproduced picture is displayed on the full screen, while if, using the shared browser 124, the data broadcast display 20 or simulated data broadcast display 33 is in the display condition, the reproduced picture is displayed in a broadcast content display area 21 of the data broadcast display 20, or in a network content display area 34 of the simulated data broadcast display 33.

In step S107, the operation input determination unit 153 determines whether or not there has been an operation by the user of a d button of a remote controller. If it is determined that the d button has not been operated, the process is advanced to step S108. In step S108, the mode determination unit 152 determines whether or not the screen is in the condition of the data broadcast display 20. This determination is carried out based on the data broadcast display flag 161. If it is determined, in step S108, that the screen is not in the condition of the data broadcast display 20, the process returns to step S102, and the process from there on is repeated. Consequently, the condition of the broadcast content full screen display 10 is continued.

Subsequently, if it is determined, in step S107, that the d button has been operated, the process is advanced to step S109. In step S109, the mode determination unit 152 determines whether or not the screen is in the condition of the data broadcast display 20. This determination too is carried out based on the data broadcast display flag 161. If it is determined, in step S109, that the screen is not in the condition of the data broadcast display 20, the process is advanced to step S110.

In step S110, the flag holding unit 154 sets the data broadcast display flag 161 in such a way as to indicate that the screen is in the condition of the data broadcast display 20.

In step S111, the shared browser controller 151 puts the started up shared browser 124 into the display condition. Meanwhile, the data broadcast processor 114 processes the data broadcast signal supplied from the demultiplexer 112, and supplies a corresponding picture signal to the AV output controller 118. Then, the screen is put into the condition of the data broadcast display 20 using the shared browser 124. Subsequently, the process is returned to step S102, and the process from there on is repeated.

That is, when the data broadcast display 20 is displayed on the screen, as long as the d button is not operated again, the process is advanced from step S107 to step S108, it is determined that the screen is in the condition of the data broadcast display 20, the process is advanced to step S111, and the condition of the data broadcast display 20 is continued.

Conversely, when the d button is operated again when the data broadcast display 20 is displayed on the screen, the process is advanced from step S107 to step S109, it is determined that the screen is in the condition of the data broadcast display 20, and the process is advanced to step S112. In step S112, the flag holding unit 154 resets the data broadcast display flag 161 in such a way as to indicate that the screen is not in the condition of the data broadcast display 20.

In step S113, the shared browser controller 151 puts the started up shared browser 124 into the non-display condition. By so doing, the screen is returned to the condition of the broadcast content full screen display 10. Subsequently, the process returns to step S102, and the process from there on is repeated.

Then, if it is determined, in step S102, that an operation instructing a shift to the network content mode has been carried out by the user, the process shifts to step S131 of FIG. 11.

In step S131, the operation input determination unit 153 determines whether or not an operation instructing a shift to the broadcast content mode (for example, an operation of a channel selection button of the remote controller, or the like) has been carried out by the user. If it is determined that no operation instructing a shift to the broadcast content mode has been carried out by the user, the process is advanced to step S132.

In step S132, the shared browser 124 controls the data communication unit 115 and, if the network content to be reproduced is accumulated in the network content accumulation unit 116, causes the content to be supplied to the network content reproduction unit 117. If the network content to be reproduced is not accumulated in the network content accumulation unit 116, the shared browser 124 causes the network content to be reproduced to be acquired from a predetermined server, and causes the content to be supplied to the network content reproduction unit 117.

In step S133, the network content reproduction unit 117 starts the decoding of the supplied network content, reproduces the sound and picture, and transmits them to the AV output controller 118. It is acceptable that the network content decoded here is content of which a download is already complete, and it is also acceptable that it is content which is being downloaded (content of a so-called progressive download).

In step S134, the AV output controller 118, as well as outputting the reproduced sound from the speaker 120, causes the reproduced picture to be displayed on the display 119 in keeping with the display or non-display condition of the simulated data broadcast display 33 using the shared browser 124. That is, if, using the shared browser 124, the simulated data broadcast display 33 and data broadcast display 20 are in the non-display condition, the reproduced picture is displayed on the full screen, while if, using the shared browser 124, the simulated data broadcast display 33 or data broadcast display 20 is in the display condition, the reproduced picture is displayed in the network content display area 34 of the simulated data broadcast display 33, or in the broadcast content display area 21 of the data broadcast display 20.

In step S135, the shared browser controller 151 determines whether or not the reproduction of the network content by the network content reproduction unit 117 is finished. If it is determined that the reproduction of the network content is not finished, the process is advanced to step S136. If it is determined, in step S135, that the reproduction of the network content is finished, the process returns to step S131, and the process from thereon is repeated.

In step S136, the operation input determination unit 153 again determines whether or not an operation instructing a shift to the broadcast content mode (for example, an operation of the channel selection button of the remote controller, or the like) has been carried out by the user. If it is determined that no operation instructing a shift to the broadcast content mode has been carried out by the user, the process is advanced to step S137.

In step S137, the operation input determination unit 153 determines whether or not a simulated data broadcast display button has been operated by the user. If it is determined that the simulated data broadcast display button has not been operated, the process is advanced to step S138. In step S138, the mode determination unit 152 determines whether or not the screen is in the condition of the simulated data broadcast display 33. This determination is carried out based on the simulated data broadcast display flag 162. If it is determined, in step S138, that the screen is not in the condition of the simulated data broadcast display 33, the process returns to step S133, and the process from there on is repeated. Consequently, the condition of the network content full screen display 32 is continued.

Subsequently, if it is determined, in step S137, that the simulated data broadcast display button has been operated, the process is advanced to step S139. In step S139, the mode determination unit 152 determines whether or not the screen is in the condition of the simulated data broadcast display 33. This determination too is carried out based on the simulated data broadcast display flag 162. If it is determined, in step S139, that the screen is not in the condition of the simulated data broadcast display 33, the process is advanced to step S140.

In step S140, the flag holding unit 154 sets the simulated data broadcast display flag 162 in such a way as to indicate that the screen is in the condition of the simulated data broadcast display 33.

In step S141, the shared browser controller 151 puts the screen into the condition of the simulated data broadcast display 33, using the started up shared browser 124. Subsequently, the process is returned to step S133, and the process from there on is repeated.

That is, when the simulated data broadcast display 33 is displayed on the screen, as long as the simulated data broadcast display button is not operated again, the process is advanced from step S137 to step S138, it is determined that the screen is in the condition of the simulated data broadcast display 33, the process is advanced to step S141, and the condition of the simulated data broadcast display 33 is continued.

Conversely, when the simulated data broadcast display button is operated again when the simulated data broadcast display 33 is displayed on the screen, the process is advanced from step S137 to step S139, it is determined in step S139 that the screen is in the condition of the simulated data broadcast display 33, and the process is advanced to step S142. In step S142, the flag holding unit 154 resets the simulated data broadcast display flag 162 in such a way as to indicate that the screen is not in the condition of the simulated data broadcast display 33.

In step S143, the shared browser controller 151 puts the simulated data broadcast display 33 using the started up shared browser 124 into the non-display condition. By so doing, the screen is returned to the condition of the network content full screen display 32. Subsequently, the process returns to step S133, and the process from there on is repeated.

If it is determined, in step S131 or in step S136, that an operation instructing a shift to the broadcast content mode has been carried out by the user, the process shifts to step S103 of FIG. 10. Consequently, even though the screen is in the condition of the simulated data broadcast display 33, it is shifted seamlessly to the condition of the data broadcast display 20.

Also, conversely, in the case of being shifted from the broadcast content mode to the network content mode too, even though the screen is in the condition of the data broadcast display 20, it is shifted seamlessly to the condition of the simulated data broadcast display 33.

In the way heretofore described, in the broadcast content and network content integration process, as a shared browser which can display both the data broadcast display 20 and simulated data broadcast display 33 is started up in advance, and controlled into either a display or a non-display, it is possible to seamlessly shift reciprocally and directly between the data broadcast display 20 in the broadcast content mode and the simulated data broadcast display 33 in the network content mode.

Incidentally, the heretofore described series of processes can be executed with hardware, and can also be executed with software. In the event of executing the series of processes with software, the program configuring the software is installed from a program recording medium into a computer embedded in dedicated hardware, or into, for example, a general purpose personal computer which can execute various kinds of function by installing various kinds of program.

Embodiments of the invention are not limited to the heretofore described embodiment, and various changes are possible without departing from the scope of the invention.

The present application contains subject matter related to that disclosed in Japanese Priority Patent Application JP 2008-145690 filed in the Japan Patent Office on Jun. 3, 2008, the entire contents of which are hereby incorporated by reference.

What is claimed is:

1. A receiving apparatus comprising:
a receiving means for receiving broadcasted broadcast content and information relating to the broadcast content;
an acquisition means for acquiring network content and information relating to the network content from a predetermined server via a network;
a start-up controlling means for
starting up, in a non-display state, a browser for providing a frame display of the broadcast content and the information relating to the broadcast content and also for providing a frame display of the network content and the information relating to the network content, wherein the browser is not displayed on a screen when in the non-display state, and
maintaining the start-up condition of the browser, regardless of whether the receiving apparatus is in a broadcast content mode in which at least one of the broadcast content or the information relating to the broadcast content is displayed, or in a network content mode in which at least one of the network content or the information relating to the network content is displayed;

a shared browser controlling means for controlling a start-up of a shared browser and the display and non-display of said shared browser;

an operation input determination means for determining the existence or non-existence of each kind of operation input by the user, and the details thereof; and a flag holding means for holding the data broadcast display flag, which indicates whether or not the screen is in the condition of the data broadcast display and the simulated data broadcast display flag, which indicates whether or not the screen is in the condition of the simulated data broadcast display, and sets and resets them.

2. The receiving apparatus according to claim 1, wherein the browser switches between display and non-display of the frame display in response to a predetermined operation by a user.

3. The receiving apparatus according to claim 2, further comprising:

a maintaining means for maintaining a condition of the frame display in the browser.

4. A display control method of a receiving apparatus, comprising:

receiving broadcasted broadcast content and information relating to the broadcast content;

acquiring network content and information relating to the network content from a predetermined server via a network;

starting up, in a non-display state, a browser for providing a frame display of the broadcast content and the information relating to the broadcast content and also provides a frame display of the network content and the information relating to the network content, wherein the browser is not displayed on a screen when in the non-display state;

maintaining the start-up condition of the browser regardless of whether the receiving apparatus is in a broadcast content mode in which at least one of the broadcast content or the information relating to the broadcast content is displayed, or in a network content mode in which at least one of the network content or the information relating to the network content is displayed;

controlling a start-up of a shared browser and the display and non-display of said browser with a shared browser controlling unit;

determining the existence or non-existence of each kind of operation input by the user, and the details thereof, using an operation input determination unit; and holding the data broadcast display flag, which indicates whether or not the screen is in the condition of the data broadcast display and the simulated data broadcast display flag, which indicates whether or not the screen is in the condition of the simulated data broadcast display, and sets and resets them a flag holding unit.

5. A non-transitory computer readable medium containing instructions which causes a computer to function as:

a receiving means for receiving broadcasted broadcast content and information relating to the broadcast content;

an acquisition means for acquiring network content and information relating to the network content from a predetermined server via a network; and a start-up controlling means for starting up, in a non-display state, a browser for providing a frame display of the broadcast content and the information relating to the broadcast content and also for providing a frame display of the network content and the information relating to the network content, wherein the browser is not displayed on a screen when in the no-display state, maintaining the start-up condition of the browser regardless of whether a broadcast content mode in which at least one of the broadcast content or the information relating to the broadcast content is displayed, or a network content mode in which at least one of the network content or the information relating to the network content is displayed is selected;

a shared browser controlling means for controlling a start-up of a shared browser and the display and non-display of said shared browser;

an operation input determination means for determining the existence or non-existence of each kind of operation input by the user, and the details thereof; and a flag holding means for holding the data broadcast display flag, which indicates whether or not the screen is in the condition of the data broadcast display and the simulated data broadcast display flag, which indicates whether or not the screen is in the condition of the simulated data broadcast display, and sets and resets them.

6. A receiving apparatus comprising:

a receiving unit configured to receive broadcasted broadcast content and information relating to the broadcast content;

an acquisition unit configured to acquire network content and information relating to the network content from a predetermined server via a network; and a start-up controller configured to start up, in a non-display state, a browser for providing a frame display of the broadcast content and the information relating to the broadcast content and also for providing a frame display of the network content and the information relating to the network content, wherein the browser is not displayed on a screen when in the non-display state, maintain the start-up condition of the browser, regardless of whether the receiving apparatus is in a broadcast content mode in which at least one of the broadcast content or the information relating to the broadcast content is displayed, or in a network content mode in which at least one of the network content or the information relating to the network content is displayed.

a shared browser controlling means for controlling a start-up of a shared browser and the display and non-display of said shared browser;

an operation input determination unit configured to determine the existence or non-existence of each kind of operation input by the user, and the details thereof; and a flag holding means for holding the data broadcast display flag, which indicates whether or not the screen is in the condition of the data broadcast display and he simulated data broadcast display flag, which indicates whether or not the screen is in the condition of the simulated data broadcast display, and sets and resets them.

* * * * *